US007920055B2

(12) United States Patent
Lentes et al.

(10) Patent No.: US 7,920,055 B2
(45) Date of Patent: Apr. 5, 2011

(54) CLASSIFICATION METHOD FOR PEDESTRIAN PROTECTION SYSTEM

(75) Inventors: Anne Lentes, Hayange (FR); Werner Bieck, Wiltingen (DE); Andreas Petereit, Schweich (DE); Christian Bour, Domprix (FR)

(73) Assignee: IEE International Electronics & Engineering S.A., Luxembourg (LU)

( * ) Notice: Subject to any disclaimer, the term of this patent is extended or adjusted under 35 U.S.C. 154(b) by 499 days.

(21) Appl. No.: 11/910,577

(22) PCT Filed: Mar. 22, 2006

(86) PCT No.: PCT/EP2006/060933
§ 371 (c)(1),
(2), (4) Date: Jun. 11, 2008

(87) PCT Pub. No.: WO2006/106041
PCT Pub. Date: Oct. 12, 2006

(65) Prior Publication Data
US 2008/0266070 A1    Oct. 30, 2008

(30) Foreign Application Priority Data
Apr. 4, 2005    (EP) .................................... 05102653

(51) Int. Cl.
*B60Q 1/00*    (2006.01)
(52) U.S. Cl. .................... 340/436; 180/271; 180/274
(58) Field of Classification Search .............. 340/436, 340/435; 180/271, 274; 280/734, 735; 701/45, 701/301
See application file for complete search history.

(56) References Cited

U.S. PATENT DOCUMENTS

| 6,744,354 B2 * | 6/2004 | Stephan et al. ............... 340/436 |
| 7,303,041 B2 * | 12/2007 | Stuve ............................. 180/274 |
| 7,415,337 B2 * | 8/2008 | Hau et al. ....................... 701/45 |
| 7,603,950 B2 * | 10/2009 | Dukart .......................... 102/210 |
| 2002/0033755 A1 | 3/2002 | Ishizaki et al. |
| 2004/0066286 A1 | 4/2004 | Stephan et al. |
| 2005/0096816 A1 | 5/2005 | Takafuji et al. |
| 2009/0143987 A1 * | 6/2009 | Bect et al. ..................... 701/301 |

FOREIGN PATENT DOCUMENTS

| DE | 100 39 755 | 2/2002 |
| EP | 1 270 344 | 1/2003 |
| GB | 2 356 076 | 5/2001 |
| WO | 97/18108 | 5/1997 |

OTHER PUBLICATIONS

International Search Report; PCT/EP2006/060933; Jun. 19, 2006.

* cited by examiner

*Primary Examiner* — John A Tweel, Jr.
(74) *Attorney, Agent, or Firm* — Cantor Colburn LLP

(57) ABSTRACT

In order to provide a fast and reliable classification of an impact, the present invention proposes a method for the classification of an impact between an object and a vehicle, comprising the steps of detecting an initial contact between said object and said vehicle; recording a width data relating to a width of an impact zone between the object and the vehicle; processing said width data for determining the width of said impact zone a predetermined time interval after the initial contact; forming a first criterion for deciding whether the object is a pedestrian by identifying if the determined width of the impact zone lies between predetermined lower and upper first threshold values; determining that the object is human if said first criterion is met.

18 Claims, 2 Drawing Sheets

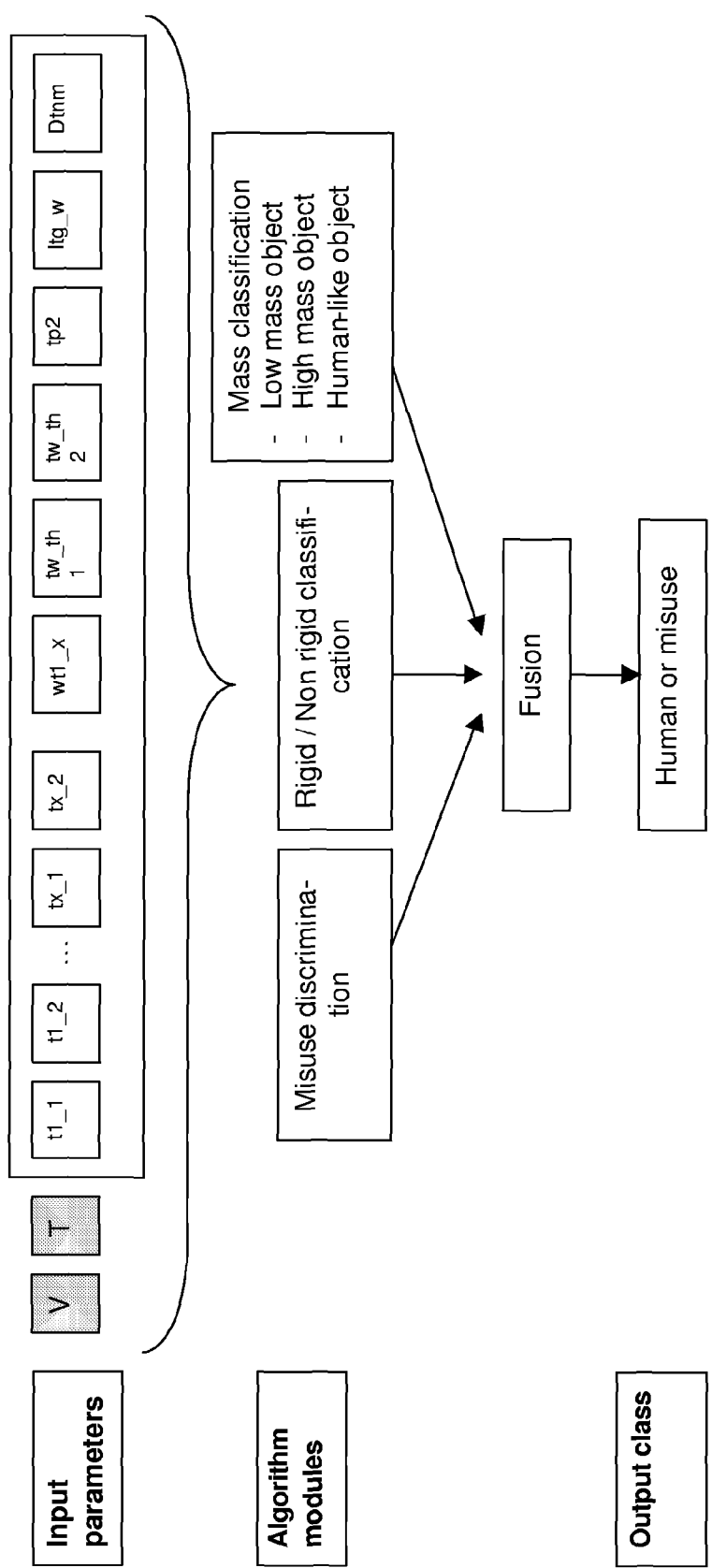

CLASSIFICATION METHOD FOR PEDESTRIAN PROTECTION SYSTEM

TECHNICAL FIELD OF THE INVENTION

The present invention generally relates to impact sensor systems for use in triggering operation of a deployable device for protecting a pedestrian hit by the front of a vehicle. The invention more specifically relates to an impact sensing method for the classification of an impact in order to discriminate between impact with a pedestrian and other types of impact.

BRIEF DESCRIPTION OF RELATED ART

When a pedestrian is hit by a motor vehicle, for example a car, one type of injury can be caused by a subsequent collision between the pedestrian's head and the hood of the vehicle. In order to minimize these injuries, vehicle manufacturers have started developing safety systems for automotive vehicles, which should help to protect pedestrians in case of a car/pedestrian collision. Such safety systems comprise one or more active systems, for example hood-mounted airbags or energy-absorbing hood panels, which are designed to minimize the impact violence of the pedestrian on the vehicle structure such as the engine hood.

It is clear that an efficient control of such active systems requires reliable sensing devices, which are able to timely sense the presence of a car/pedestrian collision. The decision of whether to deploy or not to deploy must be made in a very short space of time after detecting an initial impact at the front of the vehicle.

One pedestrian impact sensor system which has been proposed is described in International Patent Application No. WO 97/18108. This system uses a first sensor on the front bumper (fender) and a second sensor on the front edge of the hood of the vehicle. By measuring the time difference between triggering of the first sensor and triggering of the second sensor, and the magnitudes of the signals from those sensors, the system can distinguish between impacts with pedestrians and other sorts of impacts.

BRIEF SUMMARY OF THE INVENTION

The invention provides a different method for detecting a pedestrian impact with a vehicle, which enables to discriminate between impact with a pedestrian and other types of impact.

In order to provide a fast and reliable classification of an impact, the present invention proposes a method for the classification of an impact between an object and a vehicle, comprising
- detecting an initial contact between said object and said vehicle;
- recording a width data relating to a width of an impact zone between the object and the vehicle;
- processing said width data for determining the width of said impact zone a predetermined time interval after the initial contact;
- forming a first criterion for deciding whether the object is a pedestrian by identifying if the determined width of the impact zone lies between predetermined lower and upper first threshold values;
- determining that the object is human if said first criterion is met.

The method of the present invention is thus based on the evaluation of the width of the impact zone between the object and the vehicle. The width of the impact zone, i.e. the width of the contact surface between the object and the vehicle, may be measured by any suitable sensor, which is e.g. arranged in an appropriate bumper portion of the vehicle. The sensor for measuring the width of the impact zone may e.g. comprise an elongate foil-type switch comprising a first carrier foil with a resistive layer connected between two terminals and extending along the bumper and a second carrier foil with a conductive shunt element arranged at a certain distance from said resistor. If the foil-type switch is activated due to a collision force acting on the bumper, the shunt element is pressed against the underlying resistive layer and shunts the resistive layer across the extension of the contact zone. The resulting decrease of the resistance between the terminals is then indicative of the width of the impact zone. In a preferred embodiment, the sensor for detecting the width data is configured as a foil-type pressure sensor and thus further delivers an information on the amplitude of the force i.e. the force level. Such foil-type pressure sensors may e.g. be configured as linear potentiometers which provide simultaneously information on the magnitude or amplitude of the force and the location of the force acting on the sensor or the width of the activated zone.

It should be noted that the initial contact between the object and the vehicle is preferably detected by the same sensor than the width data relating to the impact zone. In fact, if the sensitivity of the width sensor is sufficiently high, this sensor may be used for triggering the entire classification method. Alternatively, the initial contact between the object and the vehicle may be detected by a dedicated sensor.

According to the invention, the acquired width data are processed in order to determine the width of said impact zone a predetermined time interval after the initial contact. This means, that the relevant parameter for deciding on the nature of the impact is the behaviour of the impact width in the early stages of the impact. This behaviour is closely correlated to the size or mass of the object colliding with the vehicle and further to the rigidity of the object. In case of a very small or light object, the impact width after the predetermined time interval will e.g. be lower than the lower threshold value and this case may be identified as an impact with a non-human object such as a pole of a traffic sign. On the other hand, if the impact width after the predetermined time interval is above the upper threshold value, on can conclude that the size of the object is high compared to a leg of a pedestrian and the impact may be classified as being a non-human impact.

Only when the impact width after the predetermined is within the lower and upper threshold values, the impact is classified as involving a human body and the appropriate counter-measures may be activated.

It will be noted that the threshold values to be used may be theoretically determined or empirically determined and will usually be specifically adapted to one vehicle. In fact, as the sensor is arranged in the vehicle bumper e.g. below the bumper skin, the evolution of the measurable impact width depends among others on parameters such as configuration of the vehicle bumper and rigidity of the bumper skin, so that a specific adaptation of these parameters to a vehicle is required.

The predetermined time interval after which the width of the impact zone is determined will be chosen in the range of a few milliseconds, so that an initial decision on the nature of the impact can be rapidly taken. It will be noted that the determination of the impact width at a predetermined moment after the initial contact is equivalent to measuring the variation rate of the impact width in the early stages of the collision.

In a preferred embodiment of the invention the method further comprises the step of recording force data relating to the amplitude of an impact force between the object and the vehicle;

processing said force data and said width data for determining an parameter relating to the energy released by the impact in a predetermined time window after the initial contact;

forming a second criterion for deciding whether the object is a pedestrian by identifying if the energy parameter lies between predetermined lower and upper second threshold values;

determining that the object is human if said first criterion and said second criterion are met.

The energy involved in the impact is directly correlated to the mass of the object and may thus be used for confirming the decision taken based on the first criterion. The energy related parameter may be computed by integrating the product of force amplitude and impact zone width over the predetermined time window.

In a further embodiment, the width data are further processed for determining the width of said impact zone over time and a time interval is determined during which the width of said impact zone exceeds a specific third threshold value. A third criterion is then formed by identifying whether the determined time interval exceeds a specific fourth threshold value. The third criterion is thus depending on whether at a time during the impact, the width of the impact zone exceeds the third threshold value during a minimum time interval or not. If this criterion is not met, one can conclude that the object has a mass below the mass of a pedestrian and accordingly is non-human. This criterion can consequently be used to confirm a "non-human" decision if e.g. the said first or the second criteria are not met.

In a further embodiment of the method, a decision regarding the rigidity of the object is taken. In this embodiment, the method further comprises the steps of recording force data relating to the amplitude of an impact force between the object and the vehicle;

processing said force data for determining a variation rate of the amplitude of the impact force;

forming a fourth criterion by identifying if the variation rate of the amplitude exceeds a predetermined fifth threshold value;

determining that the impact object is rigid if said fourth criterion is met.

This embodiment of the method is based on the evolution of the amplitude of the force acting on the sensor in order to evaluate the rigidity of the object colliding with the vehicle. The evolution of the amplitude may be determined by recording the timings at which the force amplitude exceeds specific successive threshold values. These events may be recorded by evaluating the signal of the width sensor or by monitoring the instant of activation of dedicated threshold sensors, which are switched once the specific threshold force is exceeded. The rigidity of the object may be determined based on the time difference between the instant at which a specific threshold is passed and the instant of the initial contact or based on the time delay between the activation of two successive threshold values. If the time delay stays below a specific value, it can be concluded that the object is very rigid and accordingly non-human.

A further variant of the method involves processing said width data for determining the width of said impact zone over time, determining a time interval during which the width of said impact zone exceeds a specific sixth threshold value and determining a duration after which the width of said impact zone falls to a specific seventh threshold value, e.g. zero. With these data, a fifth criterion may be formed a by identifying whether the determined duration exceeds a predetermined eighth threshold value and the object is determined to be human if said fifth criterion is met.

The parameters computed in this variant give an information about the shape of the width signal. This shape information is correlated to the type of object hitting the car. For instance, the contact duration for a pole is shorter than for a human.

It will be noted that one or more of the different thresholds involved in the various embodiments of the method may depend on parameters such as the speed of the vehicle and/or the environmental temperature and should accordingly be adjusted depending on these parameters. In preferred embodiments of the invention, the method therefore further comprises the steps of determining a vehicle speed and/or an environmental temperature, and adjusting said lower and upper first threshold values and/or said lower and upper second threshold values and/or said third threshold value and/or said fourth threshold value and/or said fifth threshold value and/or said sixth threshold value and/or said seventh threshold value and/or said eighth threshold value depending on said vehicle speed and/or said environmental temperature. It should be noted that the parameters as vehicle speed and environmental temperature are parameters, which are readily available in the ECU of the vehicle and accordingly no dedicated sensors are required for the compensation of these parameters.

BRIEF DESCRIPTION OF THE DRAWINGS

The present invention will be more apparent from the following description of several not limiting embodiments with reference to the attached drawings, wherein

FIG. 2: the different modules of a human classification method

DETAILED DESCRIPTION OF THE INVENTION

Figure 1:
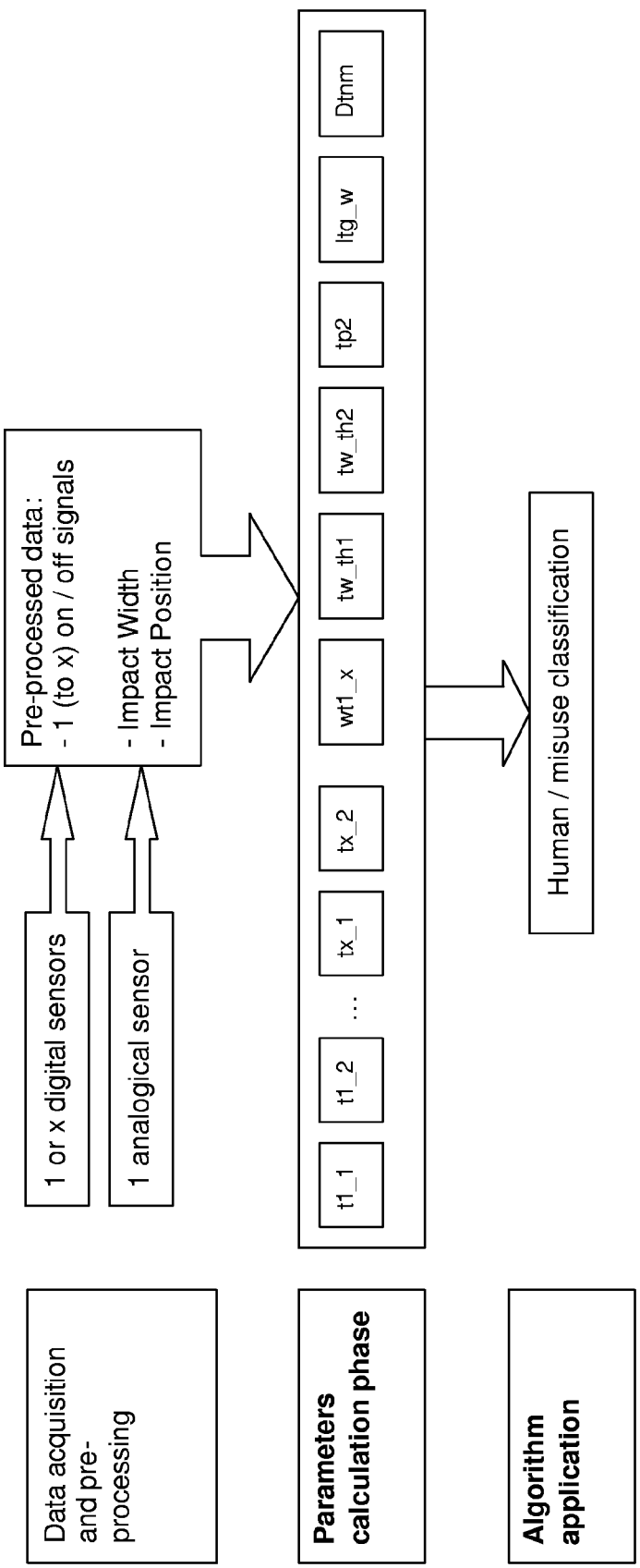
FIG. 1: shows the principle of calculation of the parameters involved in an embodiment of a method for the classification of an impact.

The present invention provides a method for the classification of an impact object during a collision with a vehicle. This object should be classified as a human (vulnerable road user) or as a non-human. If the object is classified as a human, the pedestrian protection system can be deployed.

The detection of the impact is commonly achieved by impact sensors placed in bumper foam or thermo-plastic bumper skin in front of the vehicle. Impact sensors may comprise one or more digital sensors (switch sensors which are activated if the force applied to the system is above a certain threshold level) and one or more analogue sensors (linear potentiometer sensors), which enable to determine a width of the impact zone between the object and the vehicle and the forces involved. Such a linear potentiometer sensor converts a force into resistance so that the reading of the resistance values of the linear potentiometer sensor gives an indication on the location of the impact (middle point of the impact) and on the width of the impact.

In order to classify the impacting object, a method for collision detection takes the signals from the sensors above described as inputs. The output class of the algorithm gives the result of the classification (either human or misuse) and may be fed to a control circuit for firing (activating) the hood-mounted airbags or the energy-absorbing hood panel, etc.

In a first step the data acquisition procedure measures output voltages from the sensors. These voltages can be converted into different measurement signals (pre-processed data): impact width over time, impact location over time and two switches digital signals (on/off information). If an impact with a vehicle occurs, the first contact between the object and the vehicle is detected at a certain time T1. If the analogue sensor(s) is/are designed as the most sensitive sensor(s) of the system, this detection of the initial contact is preferably achieved by these analogue sensor(s).

Subsequent to the detection of the first impact, the parameter calculation phase starts. The following parameters may be computed from the pre-processed data:

The timings $tn\_1$, $tn\_2$ (where n belongs to 1 ... x; if x corresponds to the number of switch sensors used, each sensor defines a different force activation level, i.e. $Fx<Fx+1$). $tn\_1$ corresponds to the time (after T1) at which the $n^{th}$ switch sensor is on. $tn\_2$ corresponds to the time at which the $n^{th}$ switch sensor is off.

$Dtnm=tm\_1-tn\_1$ describes the time delay until two successive force activation levels are detected $wt1\_x$ corresponds to the width of the impact zone measured x ms after the detection of the impact.

$tw\_th1$ (respectively $tw\_th2$) corresponds to the time interval during which the width signal is above a certain width threshold th1 (respectively th2).

$tp2$ corresponds to the time at which the analogue sensor is off.

$ltg\_w$ corresponds to the integration of the width times force over time on a fixed time window.

In a subsequent phase the human classification method is applied (see FIG. 2). The input parameters of the algorithm are the features computed during the parameters calculation phase. Additional input data are taken into consideration such as the velocity of the car (V) and the environmental temperature (T) because these two parameters have a significant influence on the impact dynamics.

The method may be divided in different independent modules which will allow to make a human/non-human classification:

Mass classification module (estimation of the mass of the impact object from the width of the impact object and the force by computing the evolution of the width over time, or the integration of the width over time, or the integration of the width times force over time): the aim of this module is to discriminate low and high mass objects from a human like object.

A first criterion for a human object is that the parameter $wt1\_x$ which corresponds to the width of the impact zone measured by the sensor at about x ms after the detection of the impact should be comprised in a certain range to be human like, this range depends on the vehicle speed.

A second criterion provides the parameter $ltg\_w$ which allows estimating about the energy of the impact object which is correlated to the mass of the object. The combination of these two criteria gives a certain probability for the object to be a low mass object or high mass object. In addition, $tw\_th1,2$ gives an additional indication of a light mass impact if both values stay below a given threshold $tw0$.

Rigid/non rigid classification module: In the case of an activation of the switch sensors, the time $tn\_1$ and the time difference Dtnm gives an indication of the rigidity of the impact object. If Dtnm stays below a certain threshold old Dt0, it means that the impact object is rigid, defining a large effective impact mass. On the contrary, it indicates that the impact object is soft, defining a small effective impact mass.

Misuse discrimination module: the aim of this module is to discriminate human from misuse objects such as traffic guiding systems or plastic/metal poles. The parameters $tw\_th1$, $tw\_th2$, $tp2$ give an information about the shape of the width signal. The contact duration for a pole is shorter than for a human. The combination of all these criteria gives a certain probability for the object to be a pole which can be estimated.

Regarding the probability for the impact object to be a high or low mass object, to be a pole or traffic guiding system or to be a too hard or too soft object, a fusion of all these properties makes it possible to discriminate the impact object and to finally classify it as a human or as a misuse with a given confidence level.

The invention claimed is:

1. A method for the classification of an impact between an object and a vehicle, comprising:
    detecting an initial contact between said object and said vehicle;
    recording width data relating to a width of an impact zone between the object and the vehicle;
    determining a width of said impact zone by processing said width data, said determined width being the width of said impact zone a predetermined time interval after the initial contact;
    forming a first criterion for deciding whether the object is a pedestrian by identifying if the determined width of the impact zone lies between predetermined lower and upper first threshold values;
    determining that the object is human if said first criterion is met.

2. A method according to claim 1, comprising
    recording force data relating to the amplitude of an impact force between the object and the vehicle;
    processing said force data and said width data for determining an parameter relating to the energy released by the impact in a predetermined time window after the initial contact;
    forming a second criterion for deciding whether the object is a pedestrian by identifying if the energy parameter lies between predetermined lower and upper second threshold values;
    determining that the object is human if said first criterion and said second criterion are met.

3. A method according to claim 1, further comprising
    processing said width data for determining the width of said impact zone over time;
    determining a time interval during which the width of said impact zone exceeds a specific third threshold value;
    forming a third criterion by identifying whether the determined time interval exceeds a specific fourth threshold value;
    determining that the object is non-human if both said first and third criteria are not met.

4. A method according to claim 2, further comprising
    processing said width data for determining the width of said impact zone over time;
    determining a time interval during which the width of said impact zone exceeds a specific third threshold value;
    forming a third criterion by identifying whether the determined time interval exceeds a specific fourth threshold value;

determining that the object is non-human if both said first and third criteria are not met.

5. A method according to claim 2, further comprising
processing said width data for determining the width of said impact zone over time;
determining a time interval during which the width of said impact zone exceeds a specific third threshold value;
forming a third criteria by identifying whether the determined time interval exceeds a specific fourth threshold value;
determining that the object is non-human if both said second and third criterion are not met.

6. A method according to claim 1, further comprising
recording force data relating to the amplitude of an impact force between the object and the vehicle;
processing said force data for determining a variation rate of the amplitude of the impact force;
forming a fourth criterion by identifying if the variation rate of the amplitude exceeds a predetermined fifth threshold value;
determining that the impact object is rigid if said fourth criterion is met.

7. A method according to claim 1, further comprising
processing said width data for determining the width of said impact zone over time;
determining a time interval during which the width of said impact zone exceeds a specific sixth threshold value;
determining a duration after which the width of said impact zone falls to a specific seventh threshold value;
forming a fifth criterion by identifying whether the determined duration exceeds a predetermined eighth threshold value;
determining that the object is human if said fifth criterion is met.

8. A method according to claim 1, further comprising
determining a vehicle speed; and
adjusting said lower and upper first threshold values depending on said vehicle speed.

9. A method according to claim 2, further comprising
determining a vehicle speed; and
adjusting said lower and upper first threshold values and/or said lower and upper second threshold values depending on said vehicle speed.

10. A method according to claim 3, further comprising
determining a vehicle speed; and
adjusting said lower and upper first threshold values and/or said third threshold value depending on said vehicle speed.

11. A method according to claim 1, further comprising
determining an environmental temperature; and
adjusting said lower and upper first threshold values depending on said environmental temperature.

12. A method according to claim 3, further comprising
determining an environmental temperature; and
adjusting said lower and upper first threshold values and/or said lower and upper second threshold values depending on said environmental temperature.

13. A method according to claim 3, further comprising
determining an environmental temperature; and
adjusting said lower and upper first threshold values and/or said third threshold value depending on said environmental temperature.

14. A method according to claim 3, further comprising
determining a vehicle speed; and
adjusting said third threshold value and/or said fourth threshold value depending on said vehicle speed.

15. A method according to claim 4, further comprising
determining a vehicle speed; and
adjusting said third threshold value and/or said fourth threshold value depending on said vehicle speed.

16. A method according to claim 5, further comprising
determining a vehicle speed; and
adjusting said third threshold value and/or said fourth threshold value depending on said vehicle speed.

17. A method according to claim 6, further comprising
determining a vehicle speed; and
adjusting said fifth threshold value depending on said vehicle speed.

18. A method according to claim 7, further comprising
determining a vehicle speed; and
adjusting said sixth threshold value and/or said seventh threshold value and/or said eighth threshold value depending on said vehicle speed.

* * * * *